United States Patent
Kubota (10) Patent No.: US 7,624,829 B2
(45) Date of Patent: Dec. 1, 2009

(54) SADDLE RIDDEN VEHICLE FUEL TANK STRUCTURE

(75) Inventor: Satoshi Kubota, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 745 days.

(21) Appl. No.: 11/336,488

(22) Filed: Jan. 20, 2006

(65) Prior Publication Data
US 2007/0169975 A1 Jul. 26, 2007

(51) Int. Cl.
*B60K 15/01* (2006.01)
(52) U.S. Cl. .................. 180/69.4; 280/833; 280/219
(58) Field of Classification Search .............. 180/69.4, 180/218, 219, 226–228, 231, 233, 251–264, 180/350, 357, 360, 908; 280/847, 848, 849
See application file for complete search history.

(56) References Cited

U.S. PATENT DOCUMENTS

| | | | | |
|---|---|---|---|---|
| 4,396,084 | A * | 8/1983 | Yoshimura et al. | 180/219 |
| 4,653,762 | A * | 3/1987 | Nakamura et al. | 280/835 |
| 4,694,924 | A * | 9/1987 | Asakura et al. | 180/68.3 |
| 4,744,432 | A * | 5/1988 | Shibata et al. | 180/68.1 |
| 4,781,264 | A * | 11/1988 | Matsuzaki et al. | 180/219 |
| 4,799,569 | A * | 1/1989 | Hattori et al. | 180/219 |
| 4,871,041 | A * | 10/1989 | Saito et al. | 180/219 |
| 4,972,875 | A * | 11/1990 | Beer et al. | 137/590 |
| 5,056,492 | A * | 10/1991 | Banse | 123/509 |
| 5,145,023 | A * | 9/1992 | Tsurumi et al. | 180/68.1 |
| 5,330,028 | A * | 7/1994 | Handa et al. | 180/219 |
| 5,613,476 | A * | 3/1997 | Oi et al. | 123/509 |
| 5,620,217 | A * | 4/1997 | Ichikawa et al. | 293/102 |
| 5,782,223 | A * | 7/1998 | Yamashita et al. | 123/510 |
| 5,934,234 | A * | 8/1999 | Shichinohe et al. | 123/90.31 |
| 6,085,857 | A * | 7/2000 | Horiuchi | 180/292 |
| 6,142,126 | A * | 11/2000 | Kanamaru | 123/509 |
| 6,213,514 | B1 * | 4/2001 | Natsume et al. | 280/833 |
| 6,237,710 | B1 * | 5/2001 | Mori et al. | 180/219 |
| 6,264,241 | B1 * | 7/2001 | Horiuchi | 280/781 |
| 6,341,792 | B1 * | 1/2002 | Okuma | 280/304.3 |
| 6,547,027 | B1 * | 4/2003 | Kalhok et al. | 180/312 |
| 6,588,449 | B1 * | 7/2003 | Kippe | 137/399 |
| 6,609,503 | B1 * | 8/2003 | Nakagawa et al. | 123/509 |
| 6,644,693 | B2 * | 11/2003 | Michisaka et al. | 280/835 |
| 6,651,764 | B2 * | 11/2003 | Fournier et al. | 180/190 |
| 6,655,365 | B2 * | 12/2003 | Beyer et al. | 123/509 |
| 6,675,778 | B1 * | 1/2004 | Kemper et al. | 123/516 |
| 6,805,214 | B2 * | 10/2004 | Maeda et al. | 180/69.4 |
| 6,851,499 | B2 * | 2/2005 | Yagisawa et al. | 180/219 |

(Continued)

*Primary Examiner*—S. Joseph Morano
*Assistant Examiner*—Vaughn T Coolman
(74) *Attorney, Agent, or Firm*—Keating & Bennett, LLP (57) ABSTRACT

A vehicle includes a fuel tank arranged underneath a seat, a fuel pump housed inside the fuel tank and including an attachment portion arranged to attach the fuel pump to an upper wall of the fuel tank, the fuel pump including at least one connector projecting upwards from the attachment portion, and a vehicle cover covering at least a portion of the vehicle. A portion of the vehicle cover extends between the upper wall of the fuel tank and the lower surface of the seat and includes an upright portion extending between an upper wall of the fuel tank and the lower surface of the seat. The vehicle protects the at least one connector of the fuel pump without causing an increase in the number of components and manufacturing steps.

10 Claims, 10 Drawing Sheets

U.S. PATENT DOCUMENTS

| | | | |
|---|---|---|---|
| 6,907,865 B1* | 6/2005 | Hanby | 123/509 |
| 7,028,800 B2* | 4/2006 | Yagisawa et al. | 180/219 |
| 7,089,917 B1* | 8/2006 | McKinster et al. | 123/509 |
| D534,840 S * | 1/2007 | Basset et al. | D12/126 |
| 7,231,996 B2* | 6/2007 | Karube et al. | 180/69.24 |
| 7,287,518 B2* | 10/2007 | Tsuruta | 123/516 |
| 7,410,191 B2* | 8/2008 | Karube et al. | 280/833 |
| 7,416,044 B2* | 8/2008 | Tsuruta | 180/282 |
| 7,441,619 B2* | 10/2008 | Hatakeyama | 180/68.3 |
| 7,445,075 B2* | 11/2008 | Ozawa et al. | 180/291 |
| 7,455,052 B2* | 11/2008 | Yagisawa | 123/509 |
| 7,484,766 B2* | 2/2009 | Iwasaki | 280/833 |
| 2003/0201637 A1* | 10/2003 | Bergman | 280/834 |
| 2003/0213419 A1* | 11/2003 | Duval et al. | 114/55.55 |
| 2005/0092266 A1* | 5/2005 | Oshima et al. | 123/41.44 |
| 2005/0126546 A1* | 6/2005 | Yagisawa | 123/509 |
| 2005/0241867 A1* | 11/2005 | Abe et al. | 180/182 |
| 2005/0263140 A1* | 12/2005 | Takano et al. | 123/509 |
| 2006/0061157 A1* | 3/2006 | Yokomizo | 297/214 |
| 2006/0273572 A1* | 12/2006 | Yamamura | 280/834 |
| 2007/0235089 A1* | 10/2007 | Koike | 137/565.17 |

* cited by examiner

SADDLE RIDDEN VEHICLE FUEL TANK STRUCTURE

BACKGROUND OF THE INVENTION

1. Field of the Invention

The present invention relates to a vehicle, such as a motorcycle, scooter, or an all terrain vehicle. More particularly, the present invention relates to technology for protecting connectors (power supply connectors, hose connectors, etc.) of a fuel pump housed in the fuel pump.

2. Description of the Related Art

In a saddle ridden vehicle such as a motorcycle or all terrain vehicle, the fuel tank is often arranged beneath the seat. A fuel pump is attached to an upper wall of this fuel tank, and the fuel pump is housed internally (refer, for example, to U.S. Pat. No. 6,805,214). This type of fuel pump generally includes a flat attachment portion at an upper portion of the pump, and this attachment portion is fixed to an upper wall of the fuel tank. Also in this type of fuel pump, connectors such as a hose connector for connecting a hose through which fuel flows, or a power supply connector for connecting an electrical wire to supply power to the fuel pump, project upwards from the attachment portion towards the lower surface of the seat.

In this type of fuel pump, it is necessary to ensure that the connector does not touch the lower surface of the seat arranged above. Therefore, for example, in order to protect the connector, a measure to fix additional protection members to the upper wall has been considered. But with this approach the number of components is increased by the number of protection members, and the number of manufacturing steps is increased due to fixing of the protection members.

It has also been considered to either lower the position of the upper wall, or to raise the position of the lower surface of the seat in order to make the distance between the lower surface of the seat and the upper wall of the fuel tank sufficiently large. But with this approach, either the capacity of the fuel tank will be reduced or the seat position becomes high and the vehicle is increased in size.

SUMMARY OF THE INVENTION

In order to overcome the problems described above, preferred embodiments of the present invention provide a saddle ridden vehicle that can protect a connector of a fuel pump projecting above the fuel tank from an attachment portion without bringing about an increase in components or manufacturing steps, reducing the capacity of the fuel tank, or increasing the vehicle size.

A saddle ridden vehicle of a preferred embodiment of the present invention includes a fuel tank arranged below a seat, a fuel pump housed inside the fuel tank and including an attachment portion for attachment to an upper wall of the fuel tank, at least one connector projecting upwards from the attachment portion, and a vehicle cover for covering at least a portion of the vehicle. A portion of the vehicle cover lies between the upper wall of the fuel tank and the lower surface of the seat and includes an upright portion extending between the upper surface of the fuel tank and the lower surface of the seat.

According to the present preferred embodiment, since the upright portion of the vehicle cover projects towards at least one of the upper wall of the fuel tank or the lower surface of the seat, there is no increase in the number of components or manufacturing steps, no reduction in the capacity of the fuel tank and no increase in the vehicle size, and the connectors of the fuel pump are protected by the upright portion.

With another preferred embodiment of the present invention, a lower edge of the upright portion of the vehicle cover is in direct or indirect contact with the upper wall of the fuel tank, and the upright portion extends towards the lower surface of the seat from the upper wall of the fuel tank.

In this preferred embodiment, since the lower edge of the upright portion of the vehicle cover is in direct or indirect contact with the upper wall of the fuel tank, the at least one connector is more reliably protected.

With another preferred embodiment of the present invention, the upright portion of the vehicle cover encloses the at least one connector of the fuel pump.

In this preferred embodiment, since the upright portion of the vehicle cover encloses the at least one connector of the fuel pump, the at least one connector is more reliably protected.

With yet another preferred embodiment of the present invention, the upright portion of the vehicle cover is higher than the connector of the fuel pump.

In this preferred embodiment, since the upright portion of the vehicle cover is higher than the at least one connector of the fuel pump, the at least one connector is more reliably protected.

With a still further preferred embodiment of the present invention, the upright portion of the vehicle cover is provided so as to enclose the at least one connector of the fuel pump, and includes an opening. Connection wires or lines for connecting to a power supply connector of the fuel pump extend through the opening of the upright portion.

In this preferred embodiment, since connection lines connected to the fuel pump are connected to the power supply connector by passing through the opening in the upright portion, the connection lines are also protected by the upright portion.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
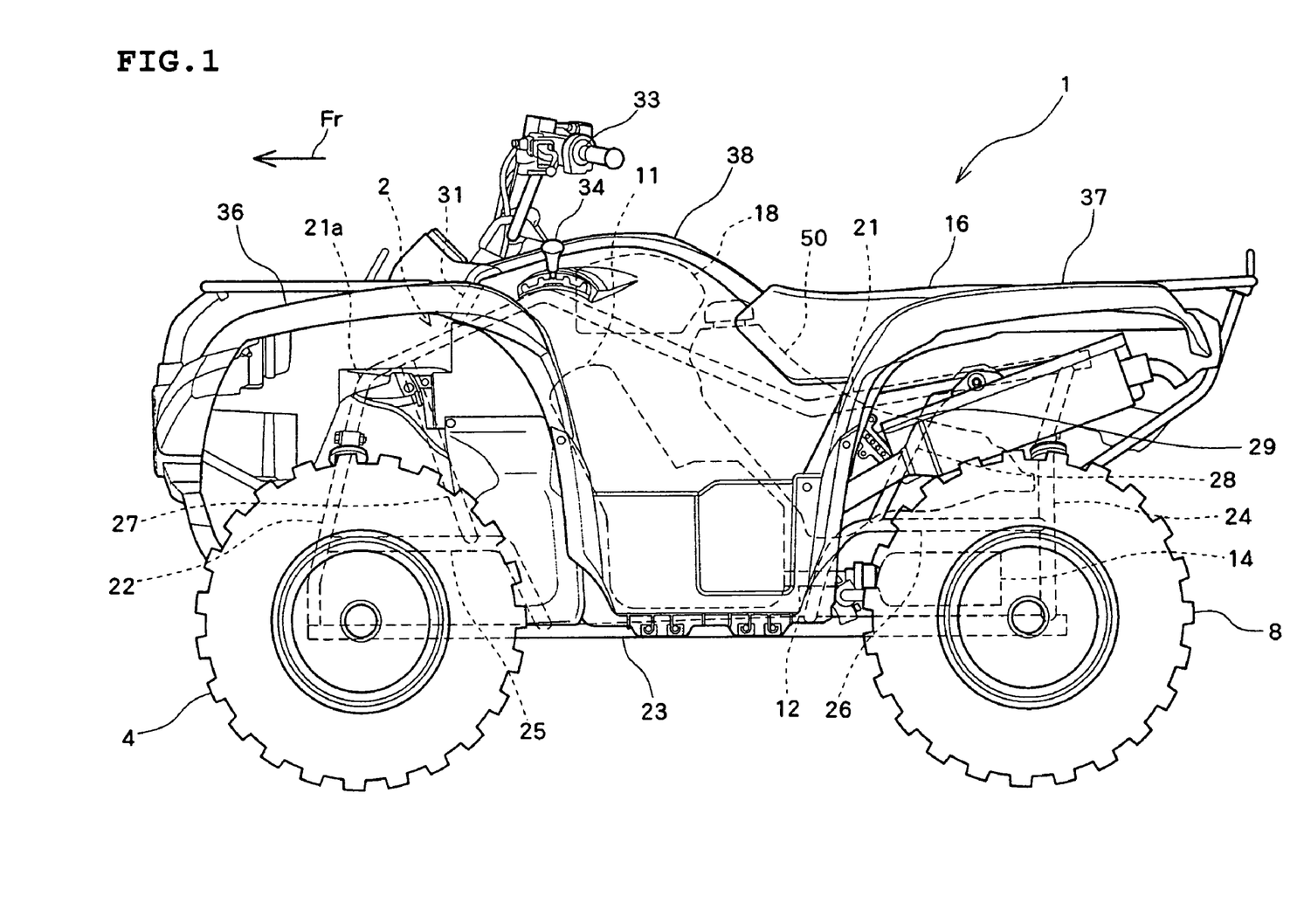
FIG. 1 is a left side elevation of an all terrain vehicle as an example of a saddle ridden vehicle according to a preferred embodiment of the present invention.
Figure 2:
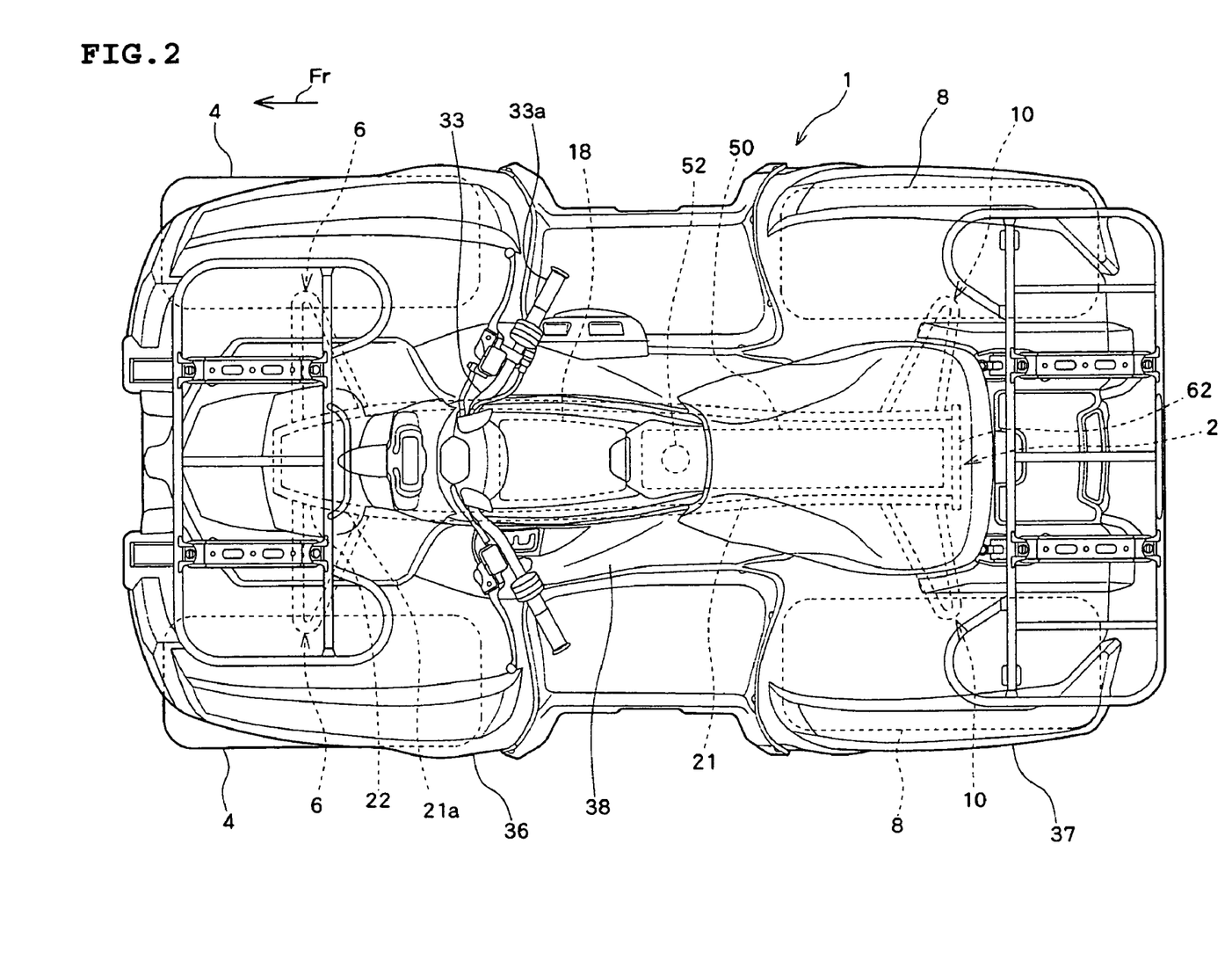
FIG. 2 is a plan view of the all terrain vehicle.

Examples of preferred embodiments of a saddle ridden vehicle of the present invention will be described in the following with reference to the drawings. FIG. 1 is a left side elevation of an all terrain vehicle 1, as an example of a saddle ridden vehicle of this preferred embodiment. FIG. 2 is a plan view of the all terrain vehicle 1.

The all terrain vehicle 1 is provided with a pair of left and right vehicle body frames 2 extending from a front portion of the vehicle towards the rear. An upper portion of the vehicle body frame 2 is provided with upper pipes 21 that extend in a front and rear direction of the vehicle. The upper pipes 21 curve diagonally downwards at a bent portion 21a provided at the front of the pipes, and a front pipe portion 22 extending diagonally downwards is connected to the bent portions 21a. The lower portion of the vehicle body frame 2 is provided with a lower pipe 23 extending in a front and rear direction of the vehicle, and a rear pipe 24 is fastened between the rear end of the lower pipe 23 and a rear end portion of the upper pipe 21.

The vehicle body frame 2 is also provided with a pair of substantially L-shaped left and right front suspension arm support pipes 25, 25, and similarly a pair of substantially L-shaped left and right rear suspension arm support pipes 26, 26. A front end portion of the front suspension arm support pipe 25 is connected to a front pipe portion 22, and a rear end portion of the front suspension arm support pipe 25 is connected to a lower pipe 23. A front end portion of the rear suspension arm support pipe 26 is connected to a lower pipe 23, and a rear end portion of the rear suspension arm support pipe 26 is connected to a rear pipe 24. A front reinforcement pipe 27 is fastened between the front suspension arm support pipe 25 and a portion slightly to the rear of the bent portion 21a of the upper pipe 21. A rear reinforcement pipe 28 is also fastened between the rear suspension support portion 26 and the upper pipe 21. A reinforcement member 29 is fastened between a midway portion of the rear reinforcement pipe 28 and the upper pipe 21. A plurality of cross members is fastened between the pair of left and right vehicle body frames 2. These cross members will be described in detail later.

Front wheels 4, 4 are arranged to the left and right of a front lower portion of the vehicle. The left and right front wheels 4, 4 are supported by left and right front wheel suspensions 6, 6. The front wheel suspension 6 includes a pair of upper and lower front side lower arms (not shown), and front side upper arms (not shown). The front side lower arms are connected to a front portion of the lower pipes 23 so as to be capable of moving up and down, and the front side upper arms are connected to the front suspension arm support pipes 25 so as to be capable of moving up and down.

Rear wheels 8, 8 are arranged to the left and right of a rear lower portion of the vehicle. The left and right rear wheels 8, 8 are supported by left and right rear wheel suspensions 10, 10. The rear wheel suspension 10 includes a pair of upper and lower rear side lower arms (not shown), and rear side upper arms (not shown). The rear lower arms are connected to a rear portion of the lower pipes 23 so as to be capable of moving up and down, and the rear side upper arms are connected to the rear suspension arm support pipes 26 so as to be capable of moving up and down.

An engine unit 11 is arranged in a central portion of the vehicle. A front end portion of a rear wheel output shaft 12 extending in the front and rear direction is connected to the engine unit 11. A rear end of the rear wheel output shaft 12 is connected to a rear wheel differential reduction unit 14 arranged at a rear lower portion of the vehicle. Drive force output from the engine unit 11 is conveyed to the rear wheel output shaft 12, the differential reduction unit 14, and then to the rear wheels 8 via drive shafts (not shown) that are connected to differential reduction unit 14 and the rear wheels 8.

The fuel tank 50 is arranged diagonally above the engine unit 11 and to the rear of the vehicle. A saddle type seat 16 for a passenger to sit on is arranged above the fuel tank 50. An air cleaner 18 for purifying air supplied to the engine unit 11 is arranged above the engine unit 11 and in front of the fuel tank 50 (in the direction shown by Fr in FIG. 1 and FIG. 2). A steering shaft 31 extending diagonally downward is arranged in front of the air cleaner 18. A handlebar 33 having grips 33a for the rider to steer the vehicle is fixed to an upper end of the steering shaft 31. A gear shift lever 34 for a rider to change gears is arranged below the handlebar 33.

The all terrain vehicle 1 is provided with a front fender 36 arranged above and covering the left and right front wheels 4, 4, a rear fender 37 arranged above and covering the rear wheels 8, 8, and a cowling 38 covering both side front portions of the fuel tank 50. A vehicle cover provided by the front fender 36, the rear fender 37, and the cowling 38 etc. covers the vehicle and functions as a mudguard.

Figure 3:
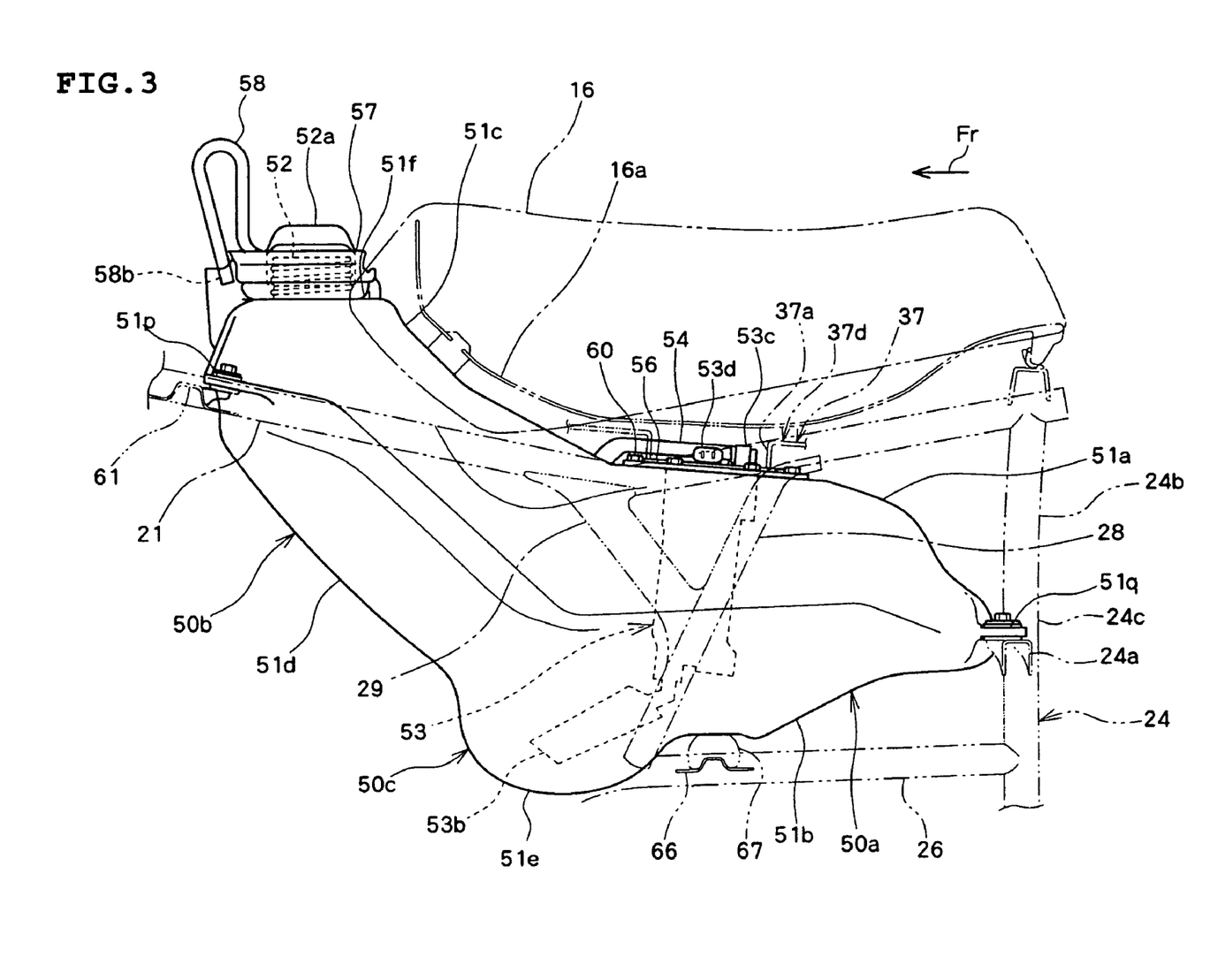
FIG. 3 is a side elevation of a fuel tank mounted on the all terrain vehicle, wherein a wire for connecting electrical power to a fuel pump is omitted, and a seat and a vehicle cover are shown by chain two-dotted lines.
Figure 4:
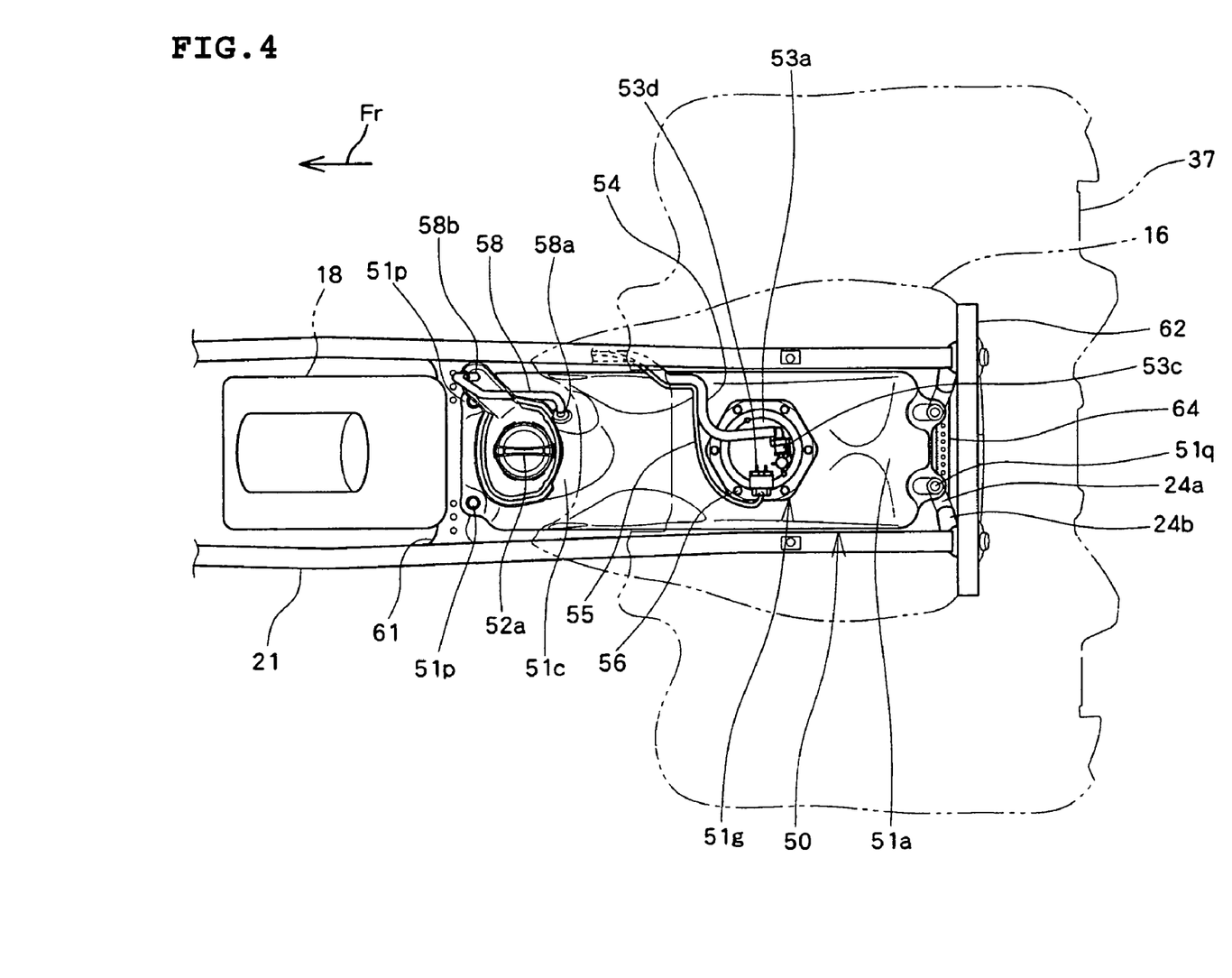
FIG. 4 is a plan view of a rear portion of the all terrain vehicle showing mainly a fuel tank, wherein the seat and a rear fender are shown by chain two-dotted lines.
Figure 5:
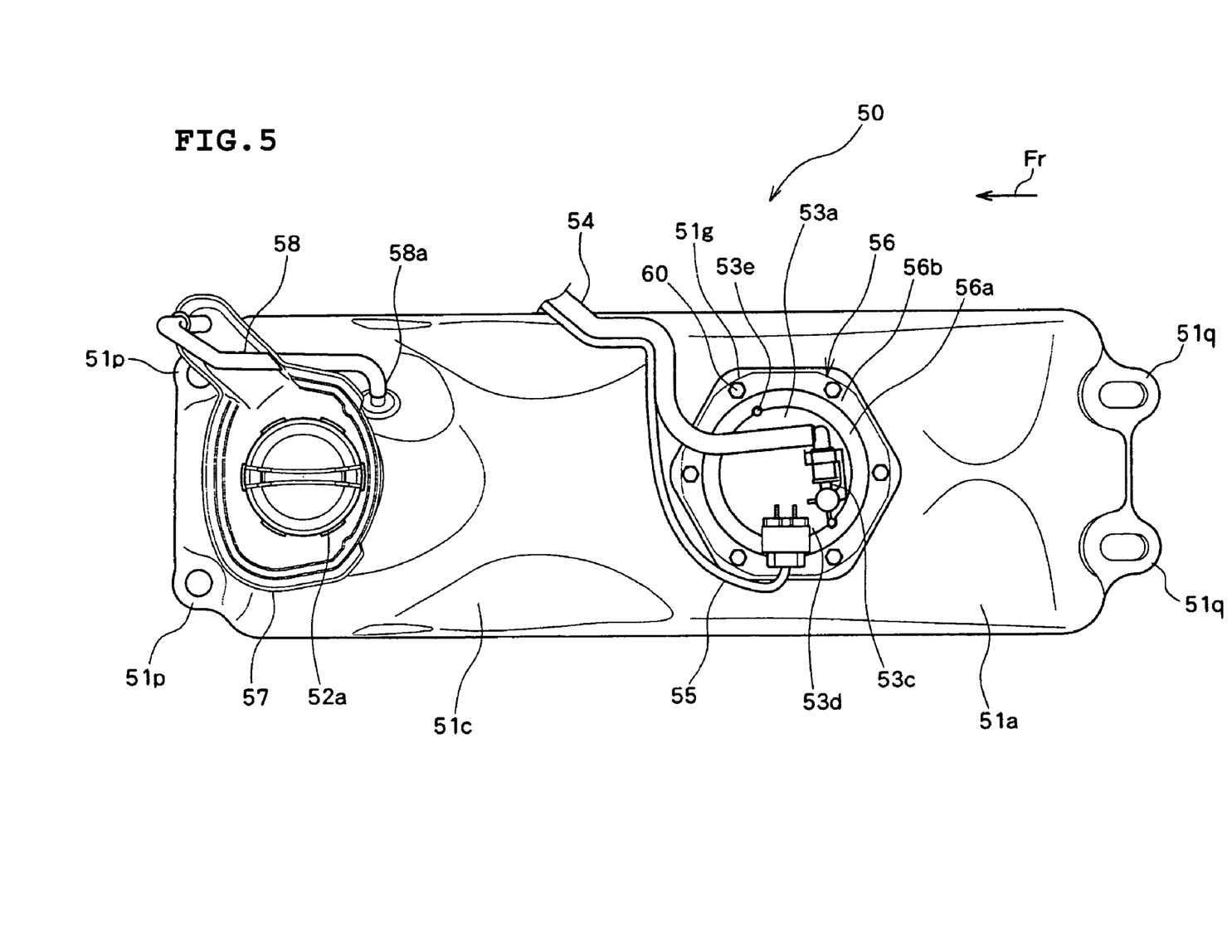
FIG. 5 is a plan view of the fuel tank.
Figure 6:
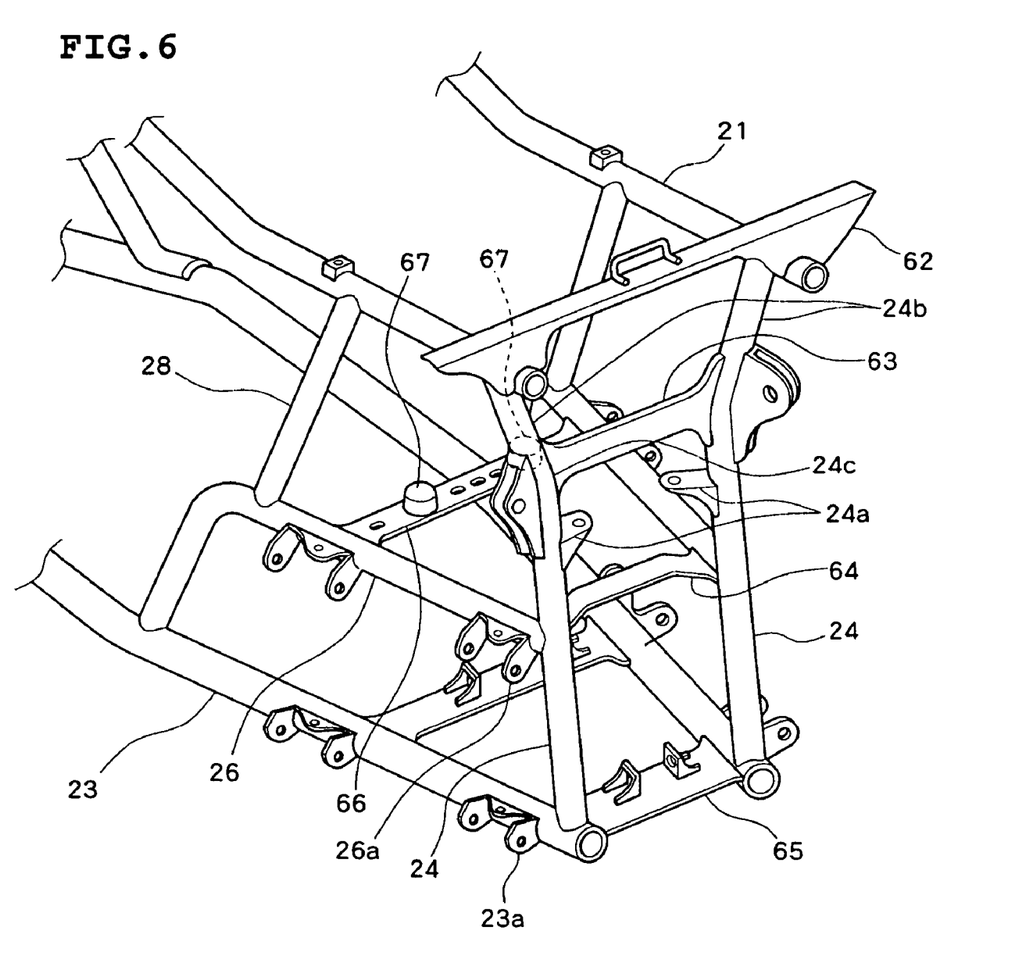
FIG. 6 is a perspective view facing a rear portion of a vehicle body frame from behind.
Figure 7:
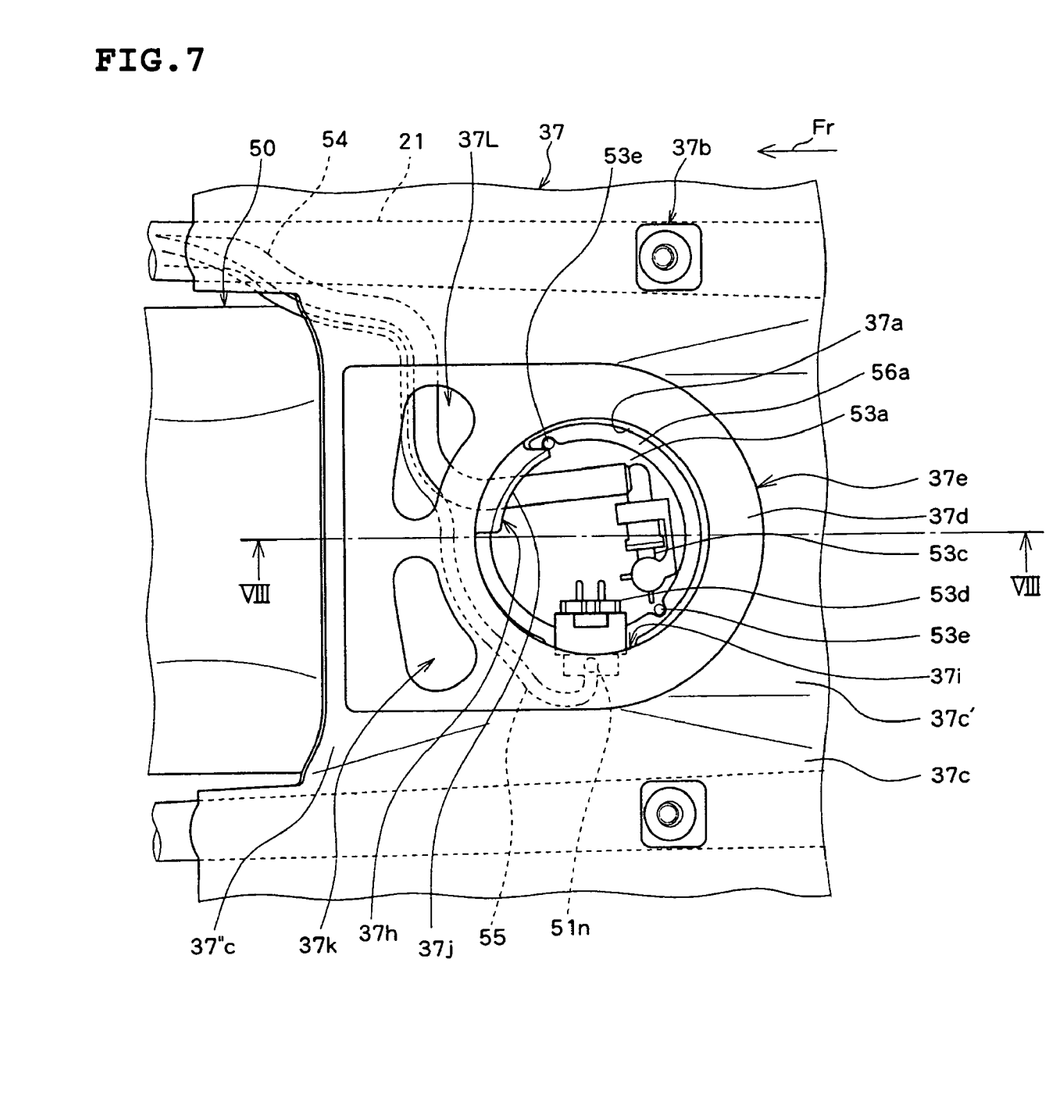
FIG. 7 is a plan view of a portion of the fuel pump for attachment to the fuel tank.
Figure 8:
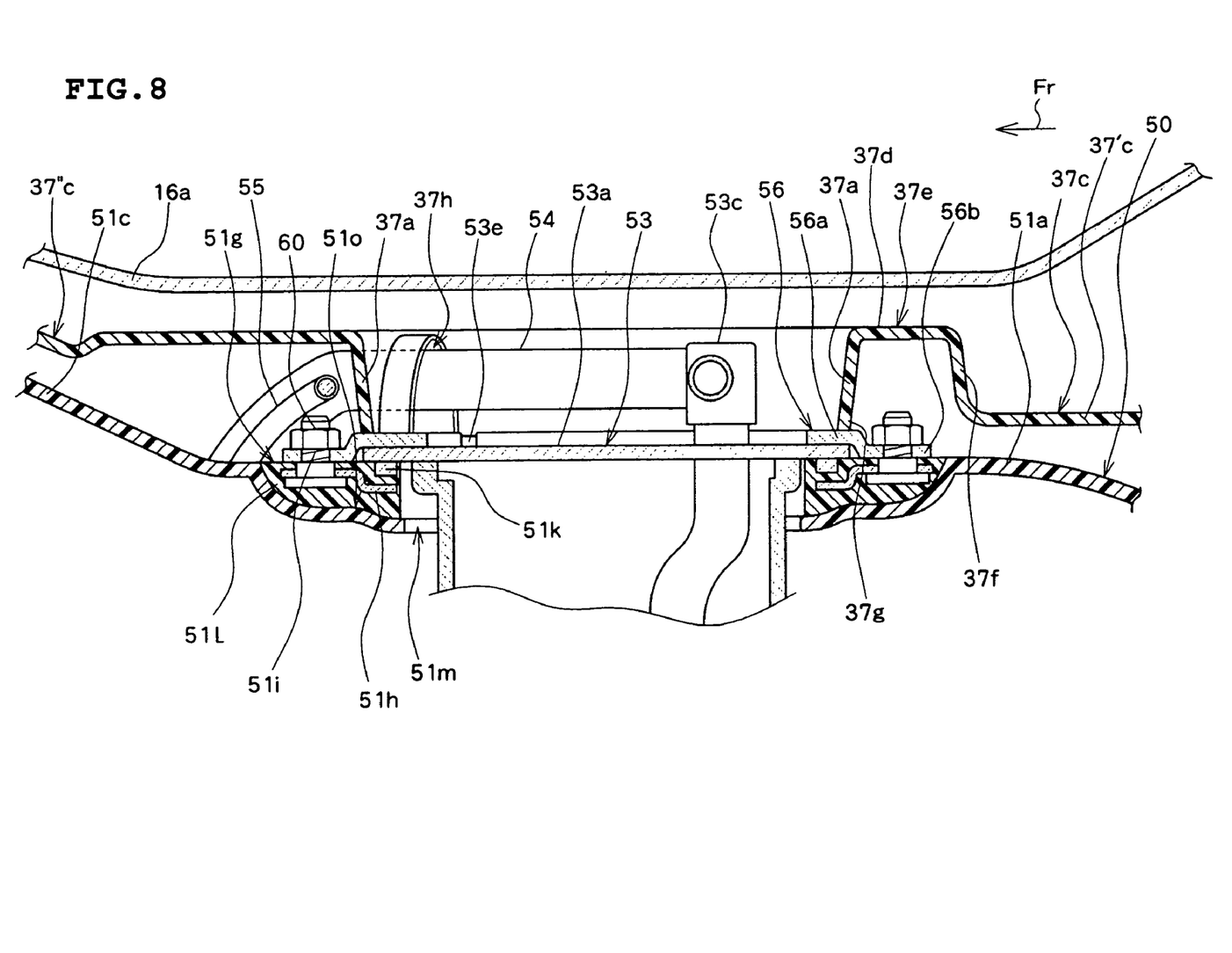
FIG. 8 is a cross-sectional view along VIII-VIII in FIG. 7.
Figure 9:
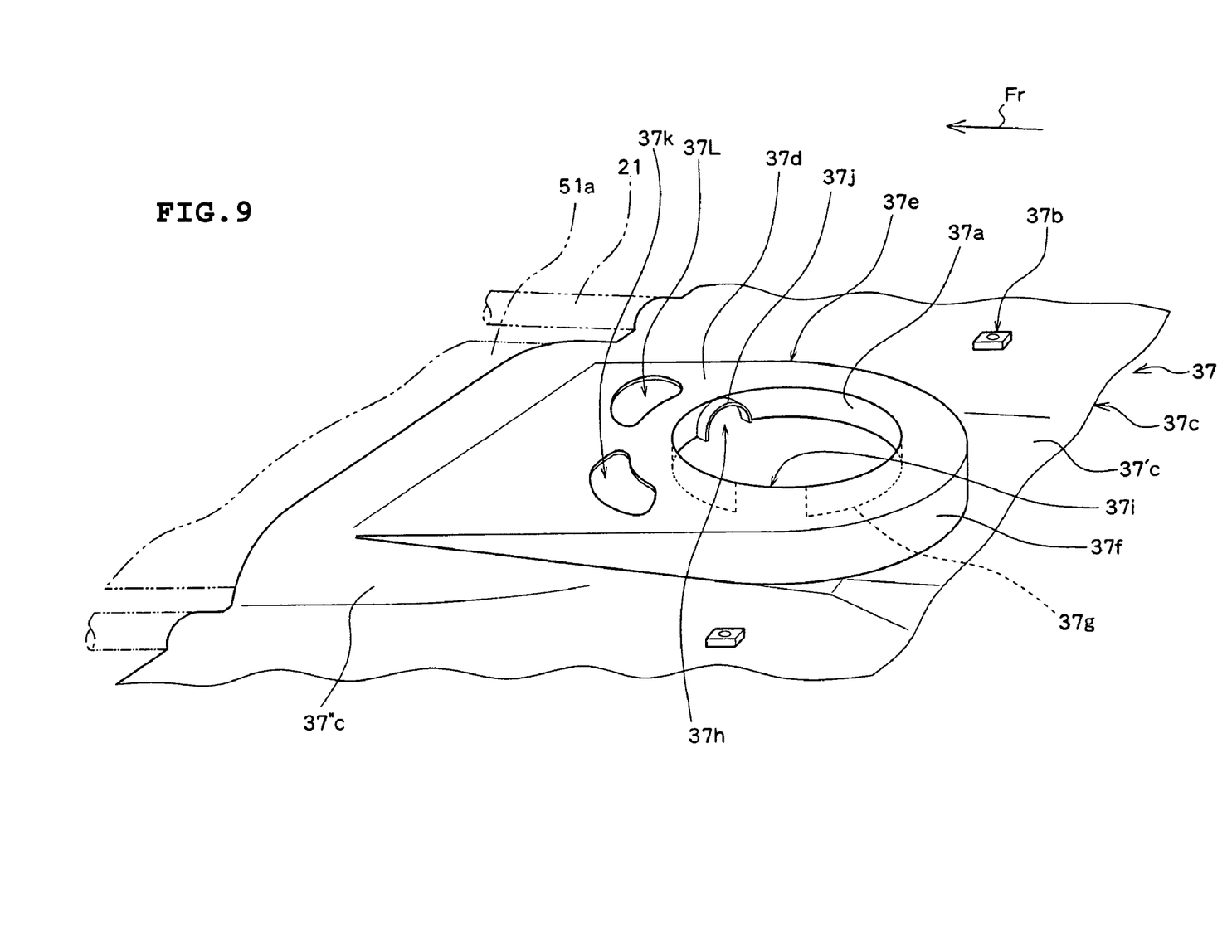
FIG. 9 is a perspective view of a rear fender close to the attachment portion of the fuel pump.

The fuel tank 50 will now be described in detail. FIG. 3 is a side elevation of the fuel tank 50, FIG. 4 is a plan view of a rear portion of the all terrain vehicle 1 mainly showing a fuel tank 50, and FIG. 5 is a plan view of the fuel tank 50. FIG. 6 is a perspective view facing a rear portion of the vehicle body frame 2 from behind. FIG. 7 is a plan view of a portion of the fuel pump 53 for attachment to the fuel tank 50, FIG. 8 is a cross-sectional view along VIII-VIII in FIG. 7, and FIG. 9 is a perspective view of a rear fender 37 close to the attachment portion of the fuel pump 53. In FIG. 3, the electrical wire 55 for connecting power to a fuel pump 53 is omitted, and a seat 16 and a vehicle body frame 2 are shown by two-dotted chain lines. Also, in FIG. 4, the seat 16 and a rear fender 37 are shown by chain two-dotted lines. In FIG. 9, a hose connector 53c and a power supply connector 53d of the fuel pump 53 are omitted.

The fuel tank 50 is preferably made of plastic, for example. The fuel tank 50 preferably has a substantially rectangular shape when viewed in plan (refer to FIG. 4 and FIG. 5). As shown in FIG. 3, when viewed from the side, a rear portion of the fuel tank 50 is mostly flat and a front portion is sloped upwards.

Specifically, a rear portion 50a of the fuel tank 50 includes a rear upper wall portion 51a that is provided in a generally flat manner, and a rear lower wall portion 51b that slopes downwards from a rear end edge of the fuel tank 50. The front portion 50b includes a front upper wall portion 51c inclined diagonally upwards towards the front, and a front lower wall portion 51d similarly inclined upwards. The front upper wall portion 51c extends from the rear upper wall portion 51a. The fuel tank 50 includes a base portion 50c at a lower portion in the middle of the tank. The base portion 50c includes a bottom wall portion 51e that is more deeply indented than the front lower wall portion 51d and the rear lower wall portion 51b. A small residual amount of fuel accumulates in this base portion 50c.

The fuel tank 50 includes a front end portion, a rear end portion, and a central lower portion supported by the vehicle body frame 2. Specifically, as shown in FIG. 4, left and right support portions 51p, 51p are provided at a front edge of the fuel tank 50. These support portions 51p, 51p are fixed preferably via a bolt to a front support cross member 61 fastened between the left and right upper pipes 21, 21.

Rear support members 24a, 24a projecting towards the center in the vehicle width direction are fixed to a mid-portion of the left and right rear pipes 24, 24 (refer to FIG. 6). Left and right support portions 51q, 51q are provided at the rear edge of the fuel tank 50. These support portions 51q, 51q are fixed preferably via bolts to the rear support members 24a, 24a.

A central support cross member 66 is also fastened between the mid-portions of the left and right rear suspension arm support pipes 26 (refer to FIG. 6). Left and right support members 67, 67 made of elastic bodies (for example, rubber) for supporting the fuel tank 50 are fixed to this central support cross member 66. The fuel tank 50 is supported by the central support cross member 66 since the rear lower wall portion 51*b* is supported by the support members 67, 67 (refer to FIG. 3). In this way, the fuel tank 50 is supported by the front support cross member 61, the rear support member 24*a*, and the central support cross member 66.

As shown in FIG. 6, the rear pipe 24 extends vertically from a lower end connected to the lower pipe 23, then bends slightly at the bent portion 24*c*, and includes inclined portions 24*b*, 24*b* inclined outwardly in the vehicle width direction. Cross members 62, 63, and 65 are respectively fastened between end portions of the left and right upper pipes 21, 21, between mid-portions of the left and right rear pipes 24, 24, and between rear end portions of the left and right lower pipes 23, 23. Also, a cross member 64 is fastened between rear end portions of the left and right rear suspension arm support pipes 26. Brackets 23*a*, 26*a* for connecting rear side lower arms (not shown) and rear side upper arms (not shown) of the above described rear wheel suspensions 10 are fixed to rear portions of the lower pipes 23 and the suspension arm support pipes 26.

As has been described above, the front upper wall portion 51*c* of the fuel tank 50 is inclined diagonally upward towards the front. A flat foremost wall portion 51*f* is provided in the center, in the vehicle width direction, of the front portion of the front upper wall portion 51*c* (refer to FIG. 3). A cylindrical fuel inlet 52 is provided in this foremost wall portion 51*f*. A tank cap 52*a* for closing off the fuel inlet 52 is fitted to the fuel inlet 52.

As shown in FIG. 3 and FIG. 5, a bowl shaped filler cover 57 that surrounds the periphery of the fuel inlet 52 is fitted to the fuel inlet 52. A drain hose, not shown, that stretches as far as underneath the engine unit 11 is connected to a base of the filler cover 57. Fuel spilling out from the fuel inlet because of excessive supply of fuel into the fuel tank 50 accumulates inside the filler cover 57, and is discharged below the engine unit 11 through the drain hose.

Also, one end 58*a* of a pressure regulator hose 58 located at the left side of the fuel inlet 52 is connected to the front upper wall portion 51*c* of the fuel tank 50. The other end 58*b* of this pressure regulator hose 58 is open to the atmosphere at an inner side of the filler cover 57. At the time of refueling, air accumulating inside the fuel tank 50 is discharged to the outside of the fuel tank 50 through this pressure regulator hose 58.

The fuel tank 50 houses the fuel pump 53. As shown in FIG. 3, FIG. 5, and FIG. 8, the fuel pump 53 is provided with a disk-shaped flat attachment portion 53*a* at an upper portion of this pump, a hose connector 53*c* for connecting a fuel hose in order to supply fuel to the engine unit 11, a power supply connector 53*d* for connecting a wire 55 for supplying electrical power to this pump, and a filter 53*b* for cleaning fuel sucked in by this pump. The filter 53*b* is positioned in the base portion 50*c* of the fuel tank 50. The power supply connector 53*d* and the hose connector 53*c* project upward (in the direction of the lower surface 16*a* of the seat 16) from the attachment portion 53*a*.

An attachment structure for fixing the fuel pump 53 to the fuel tank 50 will now be described in detail. The fuel tank 50 includes a fuel pump attachment portion 51*g* for fixing the fuel pump 53 to the fuel tank 50 on the rear upper wall portion 51*a*.

Figure 10:
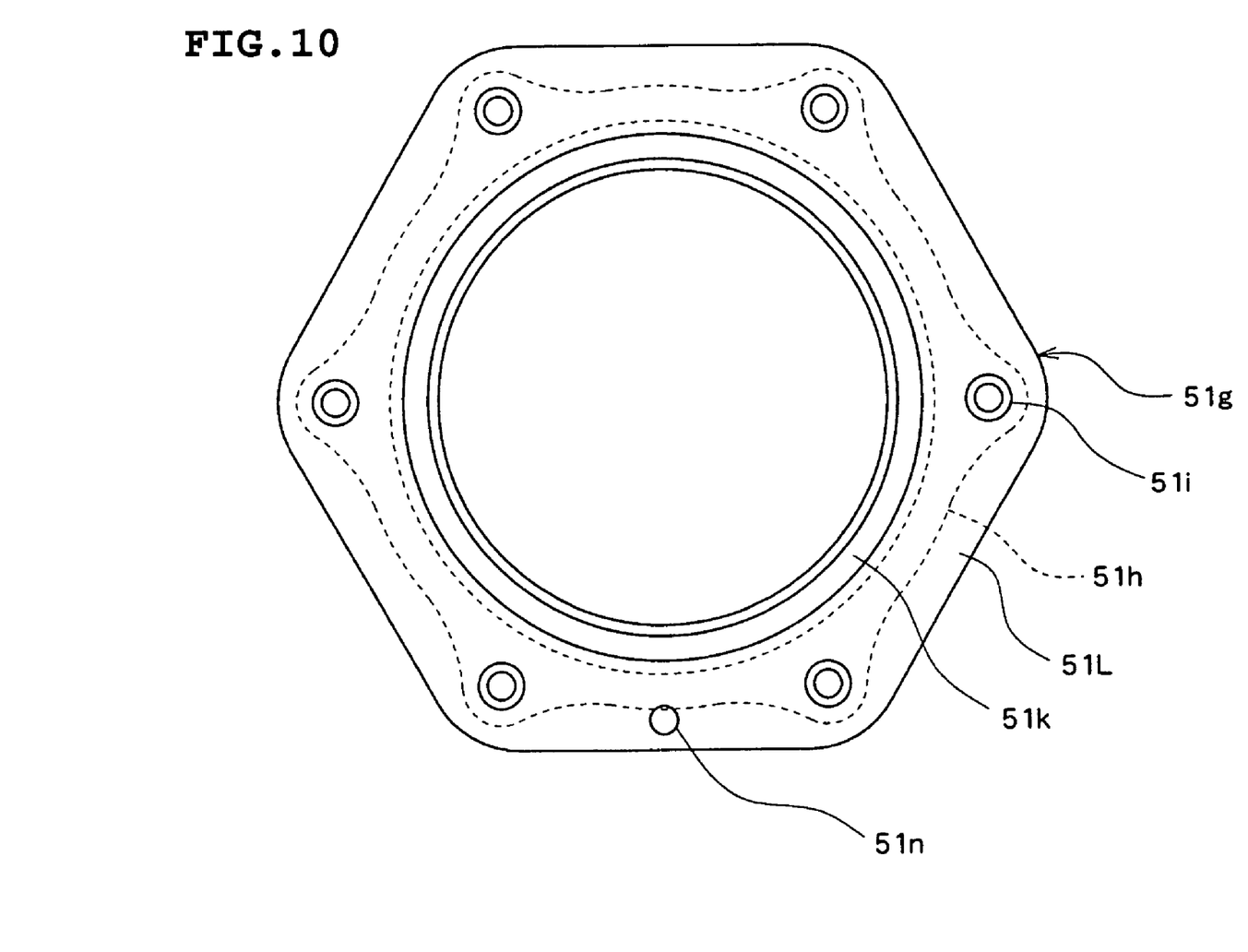
FIG. 10 is a plan view of a fuel pump attachment portion.

FIG. 10 is a plan view of the fuel pump attachment portion 51*g*. The fuel pump attachment portion 51*g* includes a hexagonal shape with rounded corners and includes a circular opening in a central portion for insertion of the fuel pump 53. A plurality of bolts 51*i* for attaching the fuel pump 53 are inserted respectively into holes provided in an annular bolt positioning member 51*h* that is made of metal. The bolts 51*i* and the bolt positioning member 51*h* are molded together preferably using resin 51L, and these define the fuel pump attachment portion 51*g*.

As shown in FIG. 8, an opening 51*m* for insertion of the fuel pump 53 is provided in the rear upper wall portion 51*a* of the fuel tank 50. A hollow portion 51*o* that is hexagonal viewed in plan and corresponding to the shape of the fuel pump attachment member 51*g* is provided in a peripheral edge of this opening 51*m*. The fuel pump attachment portion 51*g* is attached to this hollow portion 51*o*. A peripheral edge portion of the attachment portion 53*a* is fixed to the peripheral edge portion of the opening provided in the fuel pump attachment portion 51*g*. The fuel pump 53 is housed inside the fuel tank 50.

The attachment portion 53*a* is sandwiched between the annular bracket 56 and the peripheral edge portion of the opening provided in the fuel pump attachment portion 51*g*, and is fixed to the fuel tank 50. Specifically, the bracket 56 includes an outer peripheral portion 56*b* and an inner peripheral portion 56*a* that is higher than the outer peripheral portion 56*b* by the thickness of the attachment portion 53*a*. The outer peripheral portion 56*b* includes holes for insertion of bolts 51*i*. Each of the bolts 51*i* are inserted into these holes and nuts 60 are screwed onto the bolts 51*i* from above the outer peripheral portion 56*b*. Therefore, the outer peripheral portion 56*b* is fixed to the fuel pump attachment portion 51*g*. The attachment portion 53*a* is sandwiched between the upper surface of the fuel pump attachment portion 51*g* and the inner peripheral portion 56*a*, and is thus fixed to the fuel tank 50.

Incidentally, the fuel pump attachment portion 51*g* includes an annular seal member 51*k* around an opening provided for insertion of the fuel pump 53. Projection portions 51*n*, 53*e* for positioning the bracket 56 are provided in the fuel pump attachment portion 51*g* and the attachment portion 53*a* (refer to FIG. 7 and FIG. 10). With this preferred embodiment, the outer peripheral portion 56*b* of the bracket 56 is attached to the fuel pump attachment portion 51*g* by screwing in bolts. But it is also possible, for example, for the bracket 56 to be provided in a cover shape having an opening in a central portion. Thus, the outer peripheral portion 56*b* of the bracket 56 can screw directly to the fuel pump attachment portion 51*g*, and the inner peripheral portion 56*a* and the fuel pump attachment portion 51*g* can sandwich the attachment portion 53*a*. And it is also possible for the bracket 56 to be provided in a latch type plate shape. Specifically, it is possible for the outer peripheral portion of the bracket 56 to be engaged with the fuel pump attachment portion 51*g*, and this outer peripheral portion 56*b* to be locked to the fuel pump attachment portion 51*g* by rotating the bracket 56.

As has been described above, the hose connector 53*c* and the power supply connector 53*d* project upward from the attachment portion 53*a*. A structure for protecting these connectors using the rear fender 37 will now be described in detail.

The rear fender 37 extends from the position above the left and right rear wheels 8, 8 to a central portion in the vehicle width direction, and lies between a lower surface 16*a* of the seat 16 and the fuel tank 50 (refer to FIG. 3, FIG. 4, and FIG. 7). An attachment portion 37*b* of the rear fender 37 is fixed preferably via bolts to the upper pipes 21. The rear fender 37 includes a wall shaped upright portion 37a, and this upright portion 37a surrounds and protects the power supply connector 53d and the hose connector 53c projecting upwards from the attachment portion 53a.

Specifically, as shown in FIG. 9, the rear fender 37 includes a base portion 37c and a platform portion 37e rising up from the base portion 37c in a central portion of the base portion 37c in the vehicle width direction. The base portion 37c is arranged close to the rear upper wall portion 51a of the fuel tank 50, between the left and right upper pipes 21 (refer to FIG. 8).

The platform portion 37e includes an upper surface portion 37d arranged parallel to the lower surface 16a, and a side surface portion 37f defining a side surface of the platform portion 37a. The upper surface portion 37d is separated from the rear upper wall portion 51a and close to the lower surface 16a of the seat 16. The side surface portion 37f rises upwards (in the direction of the lower surface 16a of the seat 16) from the base portion 37c. The upper edge of the side surface portion 37f connects to an outer edge of the upper surface portion 37d.

The upper surface portion 37d includes a circular opening corresponding to the size of the inner peripheral portion 56a of the bracket 56 above the attachment portion 53a of the fuel pump 53. As shown in FIG. 8, the upright portion 37a extends from the inner periphery of this opening to the fuel tank 50 side (bracket 56 side), and preferably has a substantially cylindrical shape. A lower edge 37g of the upright portion 37a contacts the inner peripheral portion 56a of the bracket 56. This upright portion 37a is arranged so as to be higher than the power supply connector 53d and the hose connector 53c. Thus, the upper surface portion 37d is also arranged at a position higher than the heads of the power supply connector 53d and the hose connection portion 53c.

Two openings 37h and 37i are provided in the wall shaped upright portion 37a (refer to FIG. 7 to FIG. 9). A fuel hose 54 passes through the opening 37h and is arranged between the upper surface portion 37d and a rear upper wall portion 51a of the fuel tank 50. Also, the wire 55 is passed through the opening 37i and is arranged between the upper surface portion 37d and a rear upper wall portion 51a of the fuel tank 50. An umbrella portion 37j projecting toward a central side of the attachment portion 53a is provided in the edge of the opening 37h.

Also, two openings 37k and 37L are provided in a portion of the upper surface portion 37d. At the time of installing or maintaining the fuel hose 54 or the wire 55, an operator can view the fuel hose 54 or the wire 55 through the openings 37k and 37L. The base portion 37c includes a high base portion 37c', behind the platform portion 37e, that is slightly higher than elsewhere, and includes an inclined base portion 37c" inclined upwards towards the front on both sides of platform portion 37e (refer to FIG. 9).

In the all terrain vehicle 1 described above, the rear fender 37 extends between the lower surface 16a of the seat 16 and the rear upper wall portion 51a of the fuel tank 50. The rear fender 37 includes an upright portion 37a extending around the attachment portion 53a of the fuel pump 53. Therefore, a hose connector 53c and a power supply connector 53d of the fuel pump 53 are protected by the upright portion 37a. Also, since the upright portion 37a is unified with the rear fender 37, there is no need for an additional manufacturing operation to protect these connectors. Also, since the lower edge 37g of the upright portion 37a contacts the bracket 56, the hose connector 53c and the power supply connector 53d are reliably protected by the upright portion 37a so as not to touch the lower surface 16a of the seat 16.

Incidentally, in the all terrain vehicle 1 described above, the upright portion 37a of the rear fender 37 extends down from the edge of opening of the upper surface portion 37d towards the rear upper wall portion 51a of the fuel tank 50. However, the orientation of the upright portion 37a is not limited in this way. For example, it is also possible for the base portion 37c to have an opening around the attachment portion 53a, and for the upright portion 37a to be arranged so as to rise up from the edge of this opening in the direction of the lower surface 16a of the seat 16.

Also, in the all terrain vehicle 1 described above, the lower edge 37g of the upright portion 37a is in indirect contact with the rear upper wall portion 51a of the fuel tank 50 via the bracket 56. But it is also possible, for example, to be in direct contact with the rear upper wall portion 51a around the bracket 56. It is also possible for the lower edge 37g of the upright portion 37a to be in contact with the attachment portion 53a at an inner side of the inner peripheral portion 56a of the bracket 56. And it is also possible for the lower edge 37g to be in indirect contact with the rear upper wall portion 51a via the attachment portion 53a.

The present invention is not limited to the above-described preferred embodiments, but can be modified within the scope of the attached claims. Further, the technologies disclosed in above-described preferred embodiments can be used in combination, as desired.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A vehicle comprising:
   a seat;
   a fuel tank arranged below the seat;
   a fuel pump housed inside the fuel tank, the fuel pump including an attachment portion arranged to attach the fuel pump to an upper wall of the fuel tank, the fuel pump further including at least one connector extending upwards from the attachment portion; and
   a vehicle cover covering at least a portion of the vehicle; wherein
   a portion of the vehicle cover lies between the upper wall of the fuel tank and a lower surface of the seat, the portion of the vehicle cover including an upright portion extending vertically between the upper wall of the fuel tank and the lower surface of the seat; and
   the upright portion of the vehicle cover encloses the at least one connector.

2. The vehicle of claim 1, wherein a lower edge of the upright portion of the vehicle cover is in direct or indirect contact with the upper wall of the fuel tank, and the upright portion projects up towards the lower surface of the seat from the upper wall of the fuel tank.

3. The vehicle of claim 2, wherein the lower edge of the upright portion of the vehicle cover is in direct contact with the upper wall of the fuel tank.

4. The vehicle of claim 2, wherein the lower edge of the upright portion of the vehicle cover is in indirect contact with the upper wall of the fuel tank.

5. The vehicle of claim 1, wherein the at least one connector includes a power supply connector and a fuel hose connector.

6. The vehicle of claim 1, wherein the upright portion of the vehicle cover extends upward higher than the at least one connector of the fuel pump.

7. The vehicle of claim 1, wherein the seat is a saddle seat.

8. A vehicle comprising:

a seat;

a fuel tank arranged below the seat;

a fuel pump housed inside the fuel tank, the fuel pump including an attachment portion arranged to attach the fuel pump to an upper wall of the fuel tank, the fuel pump further including at least one connector extending upwards from the attachment portion; and a vehicle cover covering at least a portion of the vehicle; wherein a portion of the vehicle cover lies between the upper wall of the fuel tank and a lower surface of the seat, the portion of the vehicle cover including an upright portion extending between the upper wall of the fuel tank and the lower surface of the seat; and the upright portion of the vehicle cover encloses the at least one connector of the fuel pump, the at least one connector includes a fuel hose connector, and the upright portion includes an opening wherein a fuel hose arranged to connect to the fuel hose connector of the fuel pump passes through the opening of the upright portion.

9. A vehicle comprising:

a seat;

a fuel tank arranged below the seat;

a fuel pump housed inside the fuel tank, the fuel pump including an attachment portion arranged to attach the fuel pump to an upper wall of the fuel tank, the fuel pump further including at least one connector extending upwards from the attachment portion; and a vehicle cover covering at least a portion of the vehicle; wherein a portion of the vehicle cover lies between the upper wall of the fuel tank and a lower surface of the seat, the portion of the vehicle cover including an upright portion extending between the upper wall of the fuel tank and the lower surface of the seat; and the upright portion of the vehicle cover encloses the at least one connector of the fuel pump, the at least one connector includes a power supply connector, and the upright portion includes an opening wherein a connection wire arranged to connect to the power supply connector of the fuel pump passes through the opening of the upright portion.

10. A vehicle comprising:

a seat;

a fuel tank arranged below the seat;

a fuel pump housed inside the fuel tank, the fuel pump including an attachment portion arranged to attach the fuel pump to an upper wall of the fuel tank, the fuel pump further including at least one connector extending urwards from the attachment portion; and a vehicle cover covering at least a portion of the vehicle; wherein a portion of the vehicle cover lies between the upper wall of the fuel tank and a lower surface of the seat, the portion of the vehicle cover including an upright portion extending between the upper wall of the fuel tank and the lower surface of the seat; and the vehicle cover includes a rear fender and the portion of the vehicle cover between the upper wall of the fuel tank and the lower surface of the seat is integral with the rear fender.

* * * * *

UNITED STATES PATENT AND TRADEMARK OFFICE
CERTIFICATE OF CORRECTION

| | |
|---|---|
| PATENT NO. | : 7,624,829 B2 |
| APPLICATION NO. | : 11/336488 |
| DATED | : December 1, 2009 |
| INVENTOR(S) | : Satoshi Kubota |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 987 days.

Signed and Sealed this

Twenty-sixth Day of October, 2010

David J. Kappos
*Director of the United States Patent and Trademark Office*